(12) United States Patent
Alasmari

(10) Patent No.: US 9,638,417 B2
(45) Date of Patent: May 2, 2017

(54) APPARATUS AND METHOD FOR REDUCING AIR POLLUTION FROM EXHAUST

(71) Applicant: UMM AL-QURA UNIVERSITY, Makkah (SA)

(72) Inventor: Othman Ali Khalid Alasmari, Abba (SA)

(73) Assignee: UMM AL-QURA UNIVERSITY, Makkah (SA)

( * ) Notice: Subject to any disclaimer, the term of this patent is extended or adjusted under 35 U.S.C. 154(b) by 423 days.

(21) Appl. No.: 14/154,006

(22) Filed: Jan. 13, 2014

(65) Prior Publication Data
US 2015/0198072 A1     Jul. 16, 2015

(51) Int. Cl.
| | | |
|---|---|---|
| *F23J 15/02* | (2006.01) | |
| *B01D 50/00* | (2006.01) | |
| *F23J 15/06* | (2006.01) | |
| *B01D 47/02* | (2006.01) | |
| *B01D 47/06* | (2006.01) | |

(52) U.S. Cl.
CPC .......... *F23J 15/025* (2013.01); *B01D 47/021* (2013.01); *B01D 47/06* (2013.01); *B01D 50/006* (2013.01); *F23J 15/02* (2013.01); *F23J 15/06* (2013.01); *B01D 2247/04* (2013.01); *B01D 2247/06* (2013.01); *B01D 2247/103* (2013.01); *B01D 2247/105* (2013.01); *B01D 2247/12* (2013.01); *F23J 2217/10* (2013.01); *F23J 2217/60* (2013.01); *F23J 2219/70* (2013.01)

(58) Field of Classification Search
None
See application file for complete search history.

(56) References Cited

U.S. PATENT DOCUMENTS

| | | |
|---|---|---|
| 517,297 A | 3/1894 | Reiss |
| 3,572,264 A | 3/1971 | Mercer |
| (Continued) | | |

FOREIGN PATENT DOCUMENTS

DE          43 32 045 A1     4/1994

OTHER PUBLICATIONS

"What Is an Industrial Scrubber?" http://www.wisegeek.com/what-is-an-industrial-scrubber.htm (Retrieved on Apr. 28, 2013), 6 pages.

*Primary Examiner* — Amber R Orlando
*Assistant Examiner* — Phillip Shao
(74) *Attorney, Agent, or Firm* — Richard C. Litman

(57) ABSTRACT

An apparatus for reducing air pollution includes a piping system, at least one compressor fan, a cooling system, and a tank having at least one first filter and at least one second filter separated by at least one intermediary member. The piping system is coupled to a cooling system adapted to saturate the exhaust with water. The exhaust and contaminated water flow downward into the tank containing at least one first filter and at least one second filter separated by at least one intermediary member where the exhaust and the contaminated water are filtered. The cleaned water is recirculated through the cooling system, and the exhaust is filtered a second time through the at least one second filter, the at least one intermediary member, and the at least one first filter prior to release into the atmosphere. A method for reducing air pollution from exhaust is also provided.

12 Claims, 2 Drawing Sheets

(56) References Cited

U.S. PATENT DOCUMENTS

| | | | |
|---|---|---|---|
| 3,582,051 A | 6/1971 | Klein et al. | |
| 3,841,063 A | 10/1974 | Absher et al. | |
| 4,012,208 A | 3/1977 | Arnim et al. | |
| 4,170,458 A | 10/1979 | Hartwick | |
| 4,859,219 A | 8/1989 | Huang | |
| 5,192,345 A | 3/1993 | Pala | |
| 5,298,043 A | 3/1994 | Mai et al. | |
| 6,007,713 A | 12/1999 | Michalik | |
| 7,381,378 B2 | 6/2008 | McWhorter | |
| 2004/0231512 A1* | 11/2004 | Slayzak | B01D 47/14 95/211 |
| 2008/0289501 A1* | 11/2008 | Kapitoures | B01D 47/14 95/211 |
| 2010/0119420 A1* | 5/2010 | Chandler | B01D 47/06 422/171 |
| 2011/0121655 A1* | 5/2011 | Liu | H02J 9/062 307/77 |
| 2012/0055341 A1 | 3/2012 | Niioka | |

\* cited by examiner

APPARATUS AND METHOD FOR REDUCING AIR POLLUTION FROM EXHAUST

BACKGROUND OF THE INVENTION

1. Field of the Invention

The present invention relates to an apparatus an method for reducing air pollution and particularly to an apparatus and method for filtering and removing pollutants from exhaust discharged from factories and other such sources.

2. Description of the Related Art

One of the many ways in which air pollution is produced is through the burning of fossil fuels, such as coal, oil, and natural gas, by sources, such as factories, power plants, planes, trains, and automobiles. However, factories and power plants are two of the largest sources of toxic fumes and air pollution, such as greenhouse gases. The burning of fossil fuels, such as coal, oil, and natural gas, typically increases the amount sulfur, carbon dioxide and other contaminants in the atmosphere and can likely harm, not only the environment, through global warming, for example, but also can lead to higher incidences of cancer, as well as increased respiratory and cardiac issues.

Accordingly, various apparatuses, systems and methods, such as scrubbers, washers, and electrostatic devices, for example, can reduce the air pollution produced from the burning of fossil fuels by sources such as power plants and factories. Many, if not most, of these apparatuses, systems, and methods include the use of water to cool the exhaust as it rises and separate the contaminants from the polluted exhaust. Not only can the water cause the separation of the contaminants from the exhaust, it can also cause the contaminants to settle at the bottom of the apparatus, such as can be due to the increased weight that results from the addition of water molecules to the contaminants. Consequently, these contaminants are then discharged from the system and/or apparatus along with the contaminated water.

However, such apparatuses, systems, and methods are generally either relatively costly to implement or relatively inefficient because they typically simply filter the contaminated exhaust once and leave contaminants in the exhaust that is released back into the atmosphere. Additionally, the use of water in some of these apparatuses can not only causes corrosion in the smoke stack, but can also cause a foul odor, for example, once the exhaust has been treated.

Thus, an apparatus and method for reducing air pollution from exhaust addressing the aforementioned problems is desired.

SUMMARY OF THE INVENTION

Embodiments of an apparatus and method for reducing air pollution are provided to substantially eliminate contaminants, such as toxic fumes and pollutants, such as carbon dioxide and sulfur from exhaust, which typically results from the burning of fossil fuels, such as coal, oil, and natural gas. Embodiments of an apparatus to reduce air pollution from exhaust include at least one compressor fan attached to a downward shaped attachment to draw exhaust downward, through a conduit and a cooling system, adapted to saturate the exhaust with an exhaust cleansing fluid, such as including water, and into a tank containing at least one first filter, at least one intermediary member, and at least one second filter.

Once the exhaust is saturated with an exhaust cleansing fluid, such as including water, it, along with the contaminated exhaust cleansing fluid, such as including water, continues downward into the tank. Once in the tank, the exhaust and the contaminated exhaust cleansing fluid, such as including water, are forced through the at least one first filter, the at least one intermediary member, and the at least one second filter to remove the contaminants from the contaminated exhaust cleansing fluid, such as including water, and contaminants, such as the toxic fumes and pollutants, from the exhaust. The cleaned exhaust cleansing fluid, such as including water, is then recirculated back to the cooling system through at least one pump, while the exhaust passes through the at least one second filter, the at least one intermediary member, and the at least first filter a second time prior to the exhaust being released into the atmosphere.

Embodiments of a method for reducing air pollution from exhaust include the steps of drawing the exhaust, containing contaminants, such as the toxic fumes and pollutants, downward, through a conduit associated with a cooling system adapted to saturate the exhaust with an exhaust cleansing fluid, such as including water, and the exhaust cleansing fluid, such as including water, saturated exhaust then is drawn from the conduit into a tank having at least one first filter, at least one intermediary member, and at least one second filter, filtering the contaminated exhaust cleansing fluid, such as including water, and exhaust through the at least one first filter, the at least one intermediary member, and the at least one second filter, recycling the cleaned exhaust cleansing fluid, such as including water, that has been filtered through the cooling system, and filtering the exhaust a second time through the at least one second filter, the at least one intermediary member, and the at least one first filter prior to the exhaust being released into the atmosphere.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

The embodiments of apparatuses and methods for reducing air pollution from exhaust can provide a relatively effective and a relative energy efficient process of cleaning the exhaust with minimal energy consumption and environmental impact.

Figure 1:
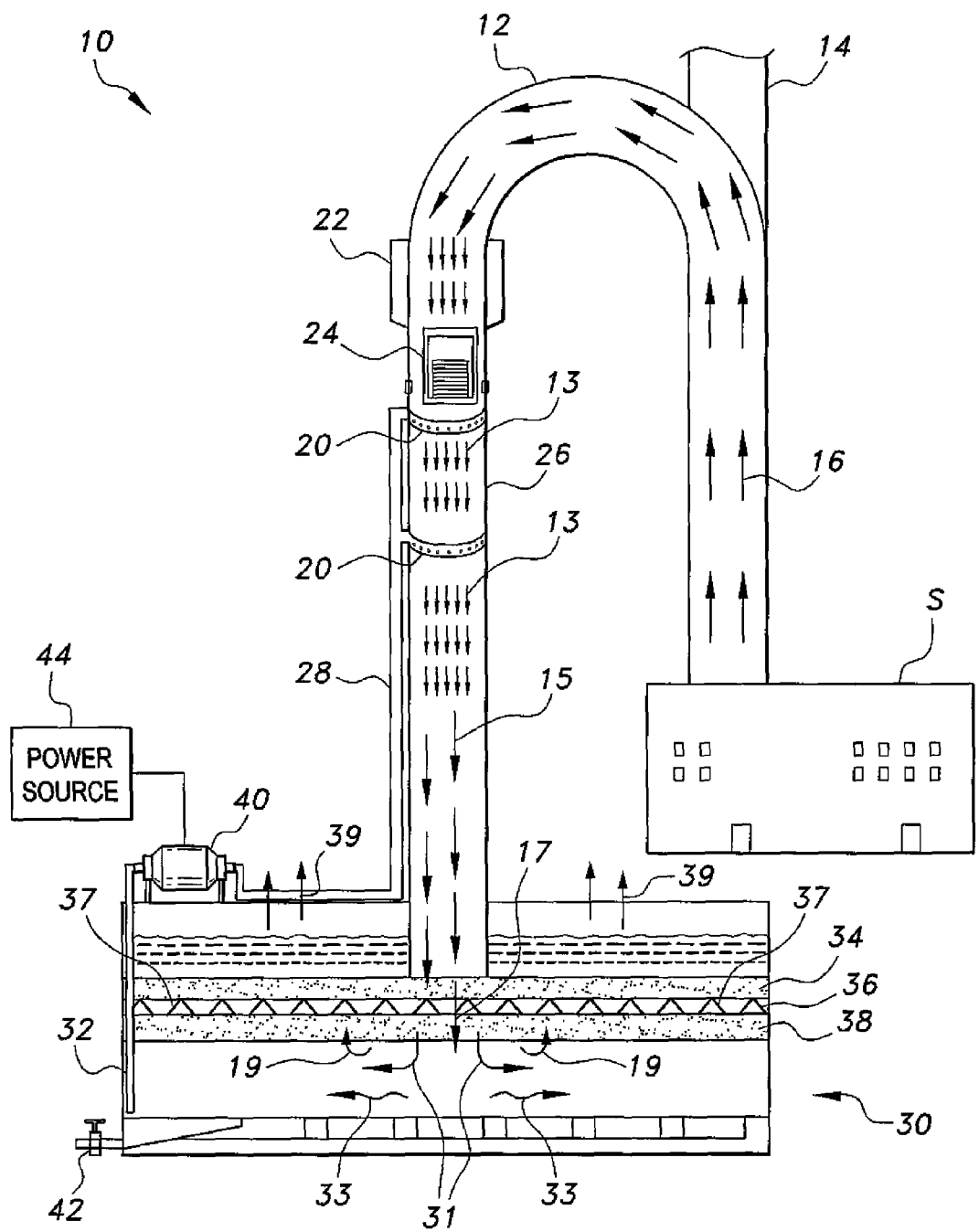
FIG. 1 is a schematic view of an embodiment of an apparatus to reduce air pollution from exhaust according to the present invention.

Referring to FIG. 1, an embodiment of an apparatus to reduce air pollution from exhaust is illustrated. The apparatus 10 includes an exhaust system 14 in communication with a piping system 12, having at least one compressor fan 22 and a cooling system 20. There can also be multiple compressor fans 22, depending on the strength and intensity of the exhaust 16, to assist in pulling down the exhaust 16 into and through the piping system 12. The piping system 12 can be curved, such as in a downward direction, to assist in preventing exhaust, indicated by the arrows 16, that typically contains contaminants, such as toxic fumes and pollutants, such as carbon dioxide, sulfur, and other contaminants, from being discharged from a source S, such as factories and power plants, into the atmosphere.

The arrows 16 indicate and illustrate the passage of the exhaust 16 from the source S through the apparatus 10 and into the piping system 12 of the apparatus 10 from the source S. As further shown by the arrows, instead of continuing upward and into the atmosphere, the exhaust 16 is drawn downward by the at least one compressor fan 22 through a conduit 26 of the piping system 12 and the cooling system 20 into a tank 30. As an alternative to a compressor fan, the apparatus 10 can also utilize at least one blower to draw the exhaust through the piping system 12 and the cooling system 20 and into the tank 30. The tank 30 can be open at the top, such as illustrated in FIG. 1, or can be a closed system, for example, and should not be construed in a limiting sense.

The cooling system 20 can use sprayers, misters, or nebulizers, for example, to disperse exhaust cleansing fluid, such as including water, onto the exhaust 16. The sprayers, misters, or nebulizers, for example, can be arranged in an overlapping configuration to ensure that the maximum amount of exhaust 16 is exposed to exhaust cleansing fluid, such as including water, and is properly saturated. Also, the number of sprayers, misters, or nebulizers used in the cooling system 20 can vary depending on the strength and intensity of the exhaust passing through the piping system 12. The cooling system 12, operates with an exhaust cleansing fluid, such as including water, so that the exhaust cleansing fluid, such as including water, typically sprays in overlapping directions to cool the exhaust 16 to assist in breaking up the molecules of the contaminants in the exhaust 16, as indicated by the arrows 13 as can be an initial step in converting the contaminants in the exhaust 16 from typically hazardous or undesirable, scattered materials to materials that can be controlled and turned into a liquid or a solid in different sizes and quantities according to the temperature and composition of the exhaust 16 from the source S.

The cooling rings of the cooling system 20, such as schematically illustrated in FIG. 1, typically can have nozzles that can apply from the outside to the inside of the piping system 12 fluid pressure, such as from the exhaust cleansing fluid, such as including water, to assist in disintegrating and cooling the exhaust, such typically by approximately 30%, for example, and the number of rings in the cooling system can depend on the strength or force of the exhaust 16 from the source S flowing through the piping system 12.

The addition of exhaust cleansing fluid, such as including water molecules, to the exhaust 16 can aid in the breakup of the molecules of the contaminants contained in the exhaust 16 by converting the molecules of the contaminants, such as toxic fumes, in the exhaust 16 from hazardous or undesirable, scattered contaminant materials into materials, such as solids and liquids, which can be controlled and filtered. Depending on the temperature of the exhaust 16 including the contaminants, such as toxic fumes, the exposure of exhaust cleansing fluid molecules, such as including water molecules, onto the exhaust 16 can convert the contaminants into solids of different sizes and quantities. This conversion into solids allows the contaminants to be filtered from the exhaust 16 more effectively than if the contaminants remained in a gaseous state. In addition to separating the contaminants, such as toxic fumes and other contaminants, such as sulfur and carbon dioxide, for example, from the exhaust 16, the addition of clean exhaust cleansing fluid, such as including water, to the exhaust 16 produces exhaust contaminated exhaust cleansing fluid, such as including water.

The at least one compressor fan 22 draws the exhaust 16 downward through the conduit 26 into the tank 30. The tank 30 can be filled with an exhaust cleansing fluid, such as including water, or can be empty so as to be able to receive the exhaust cleansing fluid, such as including water, from an independent source. The tank 30 contains at least one multi-layer filter assembly, the multi-layer filter assembly including at least one first filter 34, at least one second filter 38 and an intermediary layer 36 positioned therebetween, for example. The at least one first filter 34 and the at least one second filter 38 can be constructed from various materials, such as carbon, gravel, and concrete, or other suitable materials, depending on the contaminants in the exhaust 16 to be filtered, to capture the contaminants, such as toxic fumes and pollutants, such as sulfur and carbon dioxide, contained in the exhaust 16.

For example, the at least one first filter 34 and the at least one second filter 38 can include a concrete layer to filter the exhaust 16. In this regard, the concrete layers can include concrete of a size of approximately three quarters (¾) of an inch (approximately 1.9 centimeters (cm) to 2 cm) and 10 cm or more in width, and three eighths (⅜) of the concrete layer can be loose concrete, for example. The size and depth of the concrete layers can vary depending on the contaminants and their amounts in the exhaust 16 being filtered, as well as the force of the exhaust saturated with the exhaust cleansing fluid, such as including water, passing through the at least one first filter 34 and the at least one second filter 38. Also, the at least one first filter 34 and the at least one second filter 38 can include or be made of gravel, such as gravel of approximately three eighths (⅜) inches (approximately 1 cm) in size and a thickness of approximately 10 cm or more for one filter, and gravel of three quarters (¾) of an inch (approximately 1.9 centimeters (cm) to 2 cm) in size and 10 cm or more in thickness for the other filter, for example. Also, a lower filter in the tank 30, such as a second filter 38, can be made of gravel of three quarters (¾) of an inch (approximately 1.9 centimeters (cm) to 2 cm) in size to assist in minimizing or reducing vibrations.

Typically, the exhaust 16 saturated with exhaust cleansing fluid, such as including water, in passing through the at least one first filter 34 and the at least one second filter 38 can desirably provide approximately an 80% rate in relation to removal of contaminants in the exhaust 16, with the remaining approximately 20% of exhaust contaminants, for example, being substantially removed by at least one additional process to further clean the exhaust 16, such as by the cleaned exhaust being passed again through the at least one second filter 38 and the at least one first filter 34 to substantially remove any remaining contaminants, as described further herein. Depending on the nature of the source S generating the exhaust 16 and the contaminant removal requirements, the types, shapes, sizes and compositions of the least one first filter 34 and the at least one second filter 38 can vary, and should not be construed in a limiting sense.

The at least one first filter 34, the at least one intermediary member 36, and the at least one second filter 38 typically can be constructed in such a way as to allow the passage of the exhaust 16 and the exhaust cleansing fluid, such as including water, while, at the same time, attracting the molecules of contaminants, such as carbon dioxide and sulfur, for example, contained in the exhaust 16. The at least one first filter 34 and the at least one second filter 38 can be separated by the at least one intermediary member 36. The at least one intermediary member 36 can be made of various suitable materials, such as of a metal, as aluminum, for example, that can aid in the breakdown of molecules in the contaminants, such as toxic fumes and pollutants, contained in the exhaust 16. Also, when the at least one first filter 34, the at least one intermediary member 36, or the at least one second filter 38 are spent or used, so as to no longer provide relatively effective removal of contaminants from the exhaust 16, these components of the multi-layer filter can be removed or replaced, as needed, for example.

Layered angle portions 37, such as aluminum layered angle portions, of the at least one intermediary member 36 are spread out to enhance the dismantling or breaking down of the contaminants in the exhaust 16 in various directions, such as to provide longitudinal type filters, for example. Also, the corners, such as aluminum corners, of the intermediary member 36 are opposite of one another so that the initial movement of exhaust 16 can assist in breaking down the contaminant molecules, such as when the exhaust moves to the other corner a breakdown of the contaminant exhaust molecules by approximately 20% can result, for example.

As the at least one compressor fan 22 draws the exhaust 16 downward into the tank 30 containing the at least one first filter 34, the at least one intermediary member 36, and the at least one second filter 38, the cooling system 20, having a pump 40 coupled to a power source 44, disperses exhaust cleansing fluid, such as including water, into the conduit 26 of the piping system 12 to cool and saturate the exhaust 16. The power source 44 used to power the pump 40 can be a direct current (DC) supply or an alternating current (AC) supply. In addition to the conventional sources of power, the AC or DC can be derived from alternative energy sources, such as solar energy or solar power and wind power, or combinations thereof.

After the exhaust 16 has been saturated with exhaust cleansing fluid, such as including water, as indicated by the arrows 13, the exhaust cleansing fluid, such as including water, saturated exhaust, along with the exhaust contaminated exhaust cleansing fluid, such as including water, proceed downward through the conduit 26 into the tank 30 as indicated by the arrows 15. Once the exhaust cleansing fluid, such as including water, saturated exhaust, containing the contaminants, such as toxic fumes and the pollutants, and the contaminated exhaust cleansing fluid, such as including water, are in the tank 30, they are filtered through the at least one first filter 34, the at least one intermediary member 36, and the at least one second filter 38, as indicated by the arrow 17. This process allows the at least one first filter 36, the at least one intermediary member 36, and the at least one second filter 38 to capture the contaminants, such as carbon dioxide and sulfur, from the exhaust cleansing fluid, such as including water, saturated exhaust and the contaminated exhaust cleansing fluid, such as including water, to produce a first stage clean exhaust, as indicated by the arrows 19, and a first stage clean exhaust cleansing fluid, such as including water, as indicated by the arrows 31.

Once the first stage clean exhaust cleansing fluid, such as including water, has been produced, the first stage clean exhaust cleansing fluid, such as including water, is then drawn upward through a second conduit 32 by the pump 40, as indicated by the arrows 33, and pushed upward by the pump 40 through a third conduit 28 back into the cooling system 20 to be reused. This is one manner of controlling the exhaust cleansing fluid, such as including water, level in the tank 30. Alternatively, the exhaust cleansing fluid, such as including water, level in the tank 30 can be controlled by discharging exhaust cleansing fluid, such as including water, through a discharge valve 42 that is in communication with the tank 30.

The at least one multi-layer filter assembly is disposed at an elevated position in relation to a bottom of the tank 30 so that once the first stage clean exhaust has gone through the at least one second filter 38 of the multi-layer filter assembly, the rising exhaust cleansing fluid, such as including water, contained in the tank 30 below the at least one second filter 38, exerts pressure on the first stage clean exhaust and causes it to revert upward, as indicated by the arrows 19, thereby passing the first stage clean exhaust again through the at least one second filter 38, the at least one intermediary member 36, and the at least one first filter 34 of the at least one multi-layer filter assembly to further substantially clean the first stage clean exhaust of remaining contaminants to provide a second stage clean exhaust.

The further cleaning of the first stage clean exhaust can allow the at least one second filter 38, the at least one intermediary member 36, and the at least one first filter 34 to capture substantially remaining contaminants, such as sulfur and carbon dioxide, that can remain in the first stage clean exhaust. This second time passage can further clean the first stage clean exhaust and produces the second stage clean exhaust, as indicated by the arrows 39. The second stage clean exhaust is, thereafter, released into the atmosphere, as indicated by the arrows 39, from the tank 30, as illustrated in FIG. 1, or the second stage clean exhaust could be otherwise directed through the exhaust system 14 to exit into the atmosphere or be further contained in a repository system for use or disposal, for example, such as where the tank 30 is a closed type system.

In this regard, once in the tank 30, the exhaust 16, containing the contaminants, such as toxic fumes and pollutants, continues downward through at least one first filter 34, at least one intermediary member 36, and at least one second filter 38 and back up though the at least one second filter 38, the at least one intermediary member 36, and the at least one first filter 34 and then into the atmosphere, as indicated by the arrows 39, or is otherwise contained, as discussed. Also, the piping system 12 of the apparatus 10 can be adapted to have one or more selectively accessible openings 24 individuals can use for maintenance or servicing of the apparatus 10, and such opening 24 can be closed by a member such as a hatch and the like. Further, the number of compressor fans 22 in the piping system 12 can vary depending on the strength and the intensity of the exhaust 16 passing through the piping system 12.

Figure 2:
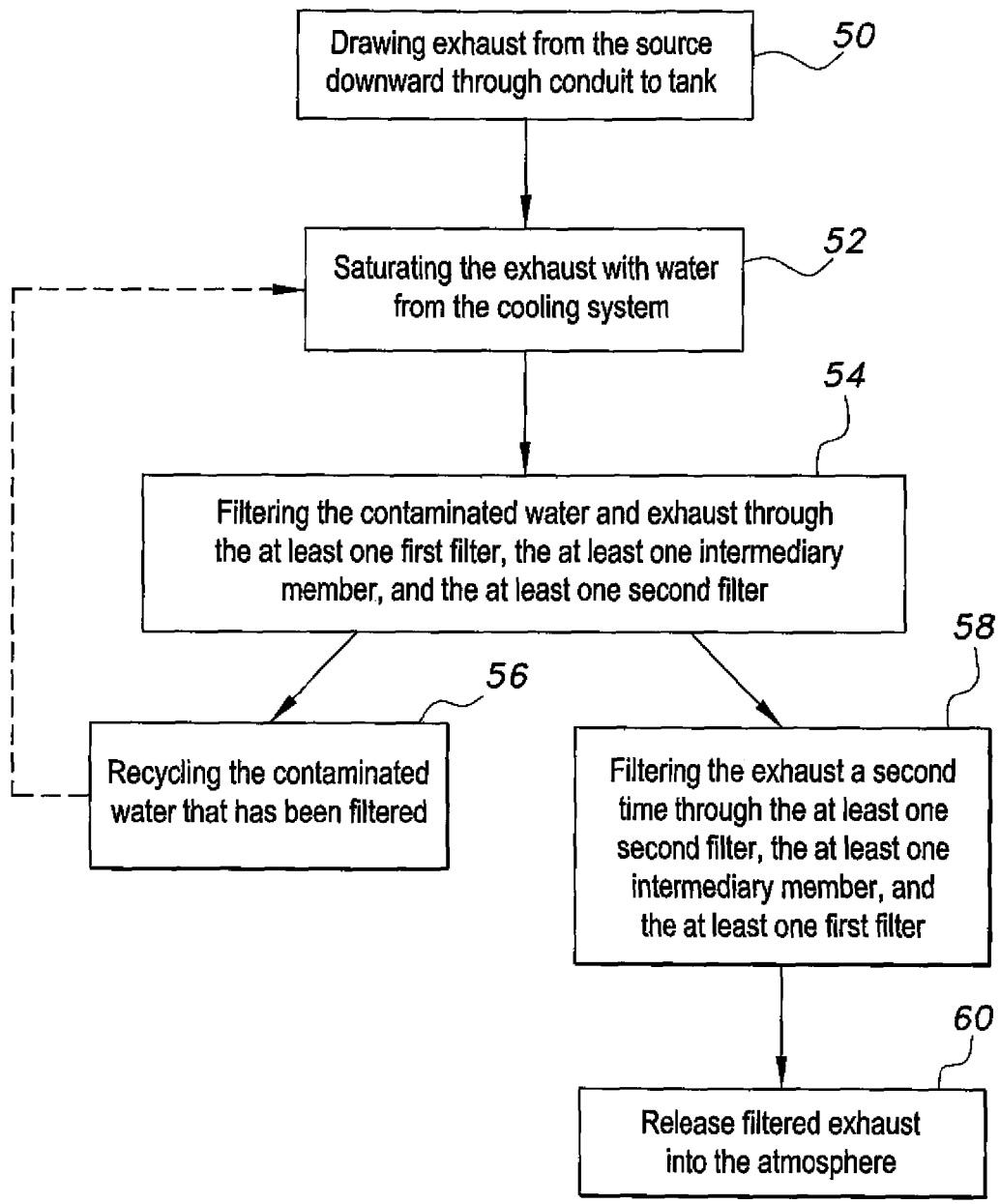
FIG. 2 is a flowchart of an embodiment of a method for reducing air pollution from exhaust according to the present invention.

Referring to FIG. 2, an embodiment of a method for reducing air pollution is illustrated and described with reference to apparatus 10 of FIG. 1. The process begins at step 50 which includes drawing the exhaust 16, containing contaminants, such as toxic fumes and pollutants, from the source S downward through the conduit 26 of the piping system 12 to the tank 30 having the at least one first filter 34, the at least one intermediary member 36, and the at least one second filter member 38. In step 52, the exhaust 16 is saturated with an exhaust cleansing fluid, such as including water, from the cooling system 20.

The process then proceeds to step 54 where the contaminated exhaust cleansing fluid, such as including water, and exhaust 16 is filtered through the at least one first filter 34, the at least one intermediary member 36, and the at least one second filter 38. From step 54, the process proceeds to recycle the contaminated exhaust cleansing fluid, such as including water, that has been filtered and cleaned, such as to reuse in the cooling system 20. The process also proceeds from step 54 to step 58 where the cleaned exhaust is then filtered a second time through the at least one second filter 38, the at least one intermediary member 36 and the at least one first filter 34. The process from step 58 then proceeds to step 60 where the second stage clean exhaust is released into the atmosphere.

Embodiments of apparatus and methods for reducing air pollution from exhaust are provided as can be helpful to factories or plants that emit exhaust that can cause pollution when contaminants, such as fumes and toxic substances, which can be harmful or undesirable to the environment are emitted. Embodiments of apparatus and methods for reducing air pollution from exhaust can therefore be useful in substantially reducing various types of pollutants as contaminants in by product exhaust generated in producing or refining products in various types of factories, plants or industries, such as in cement plants, factories with asphalt mixers, crushers, desalination plants, and various other types of factories or processes that can cause or generate exhaust fumes that can be harmful or undesirable to the environment, for example.

It is to be understood that the present invention is not limited to the embodiments described above, but encompasses any and all embodiments within the scope of the following claims.

I claim:

1. An apparatus for reducing air pollution, comprising:
   a piping system adapted for communication with an exhaust system;
   at least one compressor fan coupled to the piping system to draw exhaust from the exhaust system through the piping system;
   a cooling and saturating system to cool and saturate the exhaust with an exhaust cleansing fluid to break down one or more contaminants in the exhaust;
   a tank in communication with the piping system, the tank having at least one multi-layer filter assembly, the multi-layer filter assembly being adapted to allow the exhaust with the exhaust cleansing fluid to pass through and filter at least a portion of the one or more contaminants in the exhaust or the exhaust cleansing fluid, the at least one multi-layer filter assembly being disposed at an elevated position within the tank,
   wherein the exhaust is drawn from the exhaust system through the piping system and the cooling system by the at least one compressor fan into the tank and through the at least one multi-layer filter assembly to clean the exhaust or the exhaust cleansing fluid of at least a portion of the one or more contaminants, the elevated position of the multi-layer filter assembly facilitating additional passage of the exhaust through the multi-layer filter assembly to further clean the exhaust of at least a portion of remaining contaminants when present;
   wherein the multi-layer filter assembly includes at least one first filter, at least one second filter, and at least one intermediary member positioned between a corresponding at least one first filter and a corresponding at least one second filter; and
   a selectively accessible opening in the piping system, the opening permitting selective access for maintenance;
   wherein the cooling system is disposed along the piping system between the exhaust system and the tank.

2. The apparatus for reducing air pollution according to claim 1, further comprising:
   at least one pump coupled to a power source to recycle the exhaust cleansing fluid from the tank back to the cooling system.

3. The apparatus for reducing air pollution according to claim 2, wherein the power source is selected from the group consisting of a direct current power supply, an alternating current power supply, solar power, wind power, and combinations thereof.

4. The apparatus for reducing air pollution according to claim 1, wherein the at least one intermediary member comprises aluminum.

5. The apparatus for reducing air pollution according to claim 4, wherein the at least one intermediary member comprises layered angle portions to break down the one or more contaminants in the exhaust.

6. The apparatus for reducing air pollution according to claim 4, wherein the at least one first filter and the at least one second filter are formed of a material selected from the group consisting of concrete, carbon and gravel.

7. The apparatus for reducing air pollution according to claim 6, wherein the exhaust cleansing fluid comprises water.

8. The apparatus for reducing air pollution according to claim 1, wherein the at least one first filter and the at least one second filter are formed of a material selected from the group consisting of concrete, carbon and gravel.

9. The apparatus for reducing air pollution according to claim 8, wherein the exhaust cleansing fluid comprises water.

10. A method for reducing air pollution, comprising the steps of:
    providing an apparatus for reducing air pollution, the apparatus comprising:
    a piping system adapted for communication with an exhaust system;
    at least one compressor fan coupled to the piping system to draw exhaust from the exhaust system through the piping system;
    a cooling and saturating system to cool and saturate the exhaust with an exhaust cleansing fluid to break down one or more contaminants in the exhaust; and
    a tank in communication with the piping system, the tank having at least one multi-layer filter assembly, the multi-layer filter assembly being adapted to allow the exhaust with the exhaust cleansing fluid to pass through and filter at least a portion of the one or more contaminants in the exhaust or the exhaust cleansing fluid, the at least one multi-layer filter assembly being disposed at an elevated position within the tank;
    drawing the exhaust from the exhaust system through the piping system by the at least one compressor fan into the tank;
    providing the exhaust cleansing fluid onto the exhaust passing through the piping system;
    filtering the exhaust and the exhaust cleansing fluid through the at least one multi-layer filter assembly to provide a first stage clean exhaust; and
    filtering the first stage clean exhaust by again passing the first stage clean exhaust through the at least one multi-layer filter assembly to further clean the first stage clean exhaust of at least a portion of remaining contaminants when present to provide a second stage clean exhaust;
    wherein the multi-layer filter assembly includes at least one first filter, at least one second filter, and at least one intermediary member positioned between a corresponding at least one first filter and a corresponding at least one second filter.

11. The method for reducing air pollution according to claim 10, further comprising the step of:
    recycling the exhaust cleansing fluid from the tank back to the cooling system.

12. The method for reducing air pollution according to claim 10, wherein the exhaust cleansing fluid comprises water.

* * * * *